US012765476B2

(12) United States Patent
Hosokawa et al.

(10) Patent No.: US 12,765,476 B2
(45) Date of Patent: Oct. 20, 2026

(54) CULTIVATION METHOD FOR FRUIT VEGETABLE PLANT

(71) Applicant: FUJIFILM CORPORATION, Tokyo (JP)

(72) Inventors: Takafumi Hosokawa, Kanagawa (JP); Masao Sugimoto, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 19/292,916

(22) Filed: Aug. 7, 2025

(65) Prior Publication Data

US 2025/0359520 A1 Nov. 27, 2025

Related U.S. Application Data

(63) Continuation of application No. PCT/JP2023/047089, filed on Dec. 27, 2023.

(30) Foreign Application Priority Data

Feb. 24, 2023 (JP) ................................ 2023-027722

(51) Int. Cl.
*A01G 22/05* (2018.01)
*A01G 7/04* (2006.01)

(52) U.S. Cl.
CPC ............. *A01G 22/05* (2018.02); *A01G 7/045* (2013.01)

(58) Field of Classification Search
CPC .......... A01G 22/05; A01G 7/04; A01G 31/00; A01G 24/00; A01G 7/00
See application file for complete search history.

(56) References Cited

U.S. PATENT DOCUMENTS

2008/0034452 A1* 2/2008 Wu ................ C12Y 301/03012 800/320.2

FOREIGN PATENT DOCUMENTS

| | | | | |
|---|---|---|---|---|
| CN | 1686960 A | 10/2005 | | |
| CN | 106613836 A | 5/2017 | | |
| CN | 113016591 A | 6/2021 | | |
| CN | 115281066 A | * | 11/2022 | ........... A01C 23/042 |
| JP | H10-271924 A | 10/1998 | | |
| JP | 2006-254776 A | 9/2006 | | |
| JP | 2018-068125 A | 5/2018 | | |
| JP | 2020-114188 A | 7/2020 | | |
| WO | 2019/139031 A1 | 7/2019 | | |

OTHER PUBLICATIONS

International Search Report issued in International Application No. PCT/JP2023/047089 on Mar. 26, 2024.
Written Opinion of the ISA issued in International Application No. PCT/JP2023/047089 on Mar. 26, 2024.
Wu, Min et al., "Effects of high electrical conductivity of nutrient solution and its application timing on lycopene, chlorophyll and sugar concentrations of hydroponic tomatoes during ripening", Scientia Horticulturae, Elsevier, Amsterdam, NL, vol. 116, No. 2, Jan. 22, 2008, pp. 122-129.
Extended European Search Report dated Apr. 21, 2026, issued in corresponding EP Patent Application No. 23924272.0.
Lei, Xihong, et al., "Effects of Nutrient Solution EC Value on Yield and Quality of Tomato in Substrate Culture", Vegetables 2020.9, p. 68-71, Sep. 9, 2020.
English language translation of the following: Office action dated May 24, 2026 from the SIPO in a Chinese patent application No. 202380093402.8 corresponding to the instant patent application. This office action translation is submitted now in order to supplement the understanding of the cited references which are being disclosed in the instant Information Disclosure Statement.

* cited by examiner

*Primary Examiner* — Carly W. Lynch
(74) *Attorney, Agent, or Firm* — SOLARIS Intellectual Property Group, PLLC

(57) ABSTRACT

A cultivation method for a fruit vegetable plant, including using a nutrient solution having an electrical conductivity of 5.5 dS/m or more for a period of 3 days or more during a period from after planting to flowering of one flower cluster, and using a nutrient solution having an electrical conductivity lower than the electrical conductivity of the nutrient solution by 1.5 dS/m or more for a period from the flowering of the one flower cluster to harvesting.

5 Claims, No Drawings

CULTIVATION METHOD FOR FRUIT VEGETABLE PLANT

CROSS-REFERENCE TO RELATED APPLICATION

This application is a Continuation of International Application No. PCT/JP2023/047089, filed Dec. 27, 2023, which claims priority to Japanese Patent Application No. 2023-027722, filed Feb. 24, 2023. Each of the above applications is hereby expressly incorporated by reference, in its entirety, into the present application.

BACKGROUND OF THE INVENTION

1. Field of the Invention

The present invention relates to a cultivation method for a fruit vegetable plant.

2. Description of the Related Art

In recent years, there has been an increasing need for the production of vegetables in a plant factory using artificial light. In particular, the production technology of some leafy vegetables such as lettuce has been advanced, and the study of the cultivation method for a fruit vegetable plant such as a tomato is desired.

For example, JP1998-271924A (JP-H10-271924A) describes a method for producing a tomato having high sugar content by nutriculture, in which cultivation is performed in a cultivation period of at least one week or more within a nutriculture period using a high EC nutrient solution having electrical conductivity (EC) of a range of 0.5 to 3.0 S/m.

SUMMARY OF THE INVENTION

In the cultivation of fruit vegetable plants, there is a demand for further improvement in the yield and the sugar content of the harvested fruit.

An object to be achieved by one embodiment of the present disclosure is to provide a cultivation method for a fruit vegetable plant capable of harvesting a fruit having a higher sugar content than that in the related art, with a high yield.

The present disclosure includes the following aspects.

<1>

A cultivation method for a fruit vegetable plant, comprising:

- using a nutrient solution having an electrical conductivity of 5.5 dS/m or more for a period of 3 days or more during a period from after planting to flowering of one flower cluster; and
- using a nutrient solution having an electrical conductivity lower than the electrical conductivity of the nutrient solution by 1.5 dS/m or more for a period from the flowering of the one flower cluster to harvesting.

<2>

The cultivation method for a fruit vegetable plant according to <1>, in which the one flower cluster is a first flower cluster.

<3>

The cultivation method for a fruit vegetable plant according to <1> or <2>, in which the fruit vegetable plant is a Solanaceae plant or a Cucurbitaceae plant.

<4>

The cultivation method for a fruit vegetable plant according to any one of <1> to <3>, in which the fruit vegetable plant is a tomato.

<5>

The cultivation method for a fruit vegetable plant according to any one of <1> to <4>, in which the cultivation method including a step of irradiating a fruit vegetable plant body with artificial light.

According to one embodiment of the present disclosure, there is provided a cultivation method for a fruit vegetable plant capable of harvesting a fruit having a higher sugar content than that in the related art, with a high yield.

DESCRIPTION OF THE PREFERRED EMBODIMENTS

Hereinafter, embodiments for performing the present disclosure are described in detail. However, the present disclosure is not limited to the following embodiments. In the following embodiments, the components (including elements, steps, and the like) are not essential unless otherwise specified. The same applies to numerical values and ranges thereof, which do not limit the present disclosure.

In the present disclosure, a numerical range represented using "to" includes numerical values before and after "to" as a minimum value and a maximum value, respectively.

In a numerical range described in a stepwise manner in the present disclosure, an upper limit or a lower limit described in one numerical range may be replaced with an upper limit or a lower limit in another numerical range described in a stepwise manner. In addition, in a numerical range described in the present disclosure, an upper limit value or a lower limit value described in the numerical range may be replaced with a value described in an example.

In the present disclosure, "mass" and "weight" are synonymous.

In the present disclosure, the term "step" includes not only an independent step but also a step as long as a desired purpose of the step is achieved even in a case where the step cannot be clearly distinguished from other steps.

In the present disclosure, the "fruit vegetable plant" means a plant of which harvested product is a fruit.

In the present disclosure, the "fruit vegetable plant body" means a fruit vegetable plant that is growing. The fruit vegetable plant seedling means a fruit vegetable plant body in a state of a seedling among the fruit vegetable plant bodies.

In the present disclosure, the "nutrient solution" means a solution in which nutritional components (inorganic substances, organic substances) required for growth of a plant are dissolved in water or the like.

[Cultivation Method for Fruit Vegetable Plant]

In the cultivation method for a fruit vegetable plant according to the present disclosure, a nutrient solution having an electrical conductivity of 5.5 dS/m or more is used for a period of 3 days or more during a period from after planting to flowering of one flower cluster, and a nutrient solution having an electrical conductivity lower than the electrical conductivity of the nutrient solution by 1.5 dS/m or more is used for a period from the flowering of the one flower cluster to harvesting.

In the cultivation method for a fruit vegetable plant according to the present disclosure, a period in which a nutrient solution having an electrical conductivity of 5.5 dS/m or more is used, and a period in which a nutrient solution having an electrical conductivity lower by 1.5 dS/m or more than the electrical conductivity of 5.5 dS/m or more is used, are contained. That is, at least one switching of the nutrient solution is performed.

According to the cultivation method for a fruit vegetable plant of the present disclosure, it is possible to harvest a fruit having a higher sugar content than that in the related art, with a high yield. The reason for this is not clear, but is presumed as follows.

It is considered that by appropriately controlling the electrical conductivity of the nutrient solution in each of the period before flowering and the period after flowering, it is possible to harvest a fruit having a higher sugar content than that in the related art, with a high yield.

In contrast, JP1998-271924A (JP-H10-271924A) describes that the cultivation period using the high EC nutrient solution is set to a period after the flowering period, but there is no description focusing on the appropriate control of the electrical conductivity of the nutrient solution in each of the period before the flowering and the period after the flowering.

<Cultivation Step>

In the cultivation method for a fruit vegetable plant of the present disclosure, the period from after planting to harvesting is referred to as a cultivation step.

(Fruit Vegetable Plant)

The fruit vegetable plant is not particularly limited, and examples thereof include Solanaceae plants such as tomatoes, eggplants, and bell peppers; Cucurbitaceae plants such as melons, cucumbers, pumpkins, and zucchinis; Fabaceae plants such as green beans, peas, and broad beans; Rosaceae plants such as strawberries; Malvaceae plants such as okra; and Gramineae plants such as corn.

Among these, the cultivation method of the present disclosure is suitable for Solanaceae plants or Cucurbitaceae plants. The fruit vegetable plant cultivated by the cultivation method of the present disclosure is preferably Solanaceae plants or Cucurbitaceae plants, more preferably a tomato or a melon, and still more preferably a tomato.

The tomato includes a medium size tomato, a cherry tomato, a high-sugar tomato, and the like. In addition, the melon includes netted melons such as green flesh and orange flesh, and non-netted melons.

(Cultivation Conditions)

The cultivation of the fruit vegetable plant after planting can be performed by a known method in the related art, and may be performed by a hydroponic method or a soil-based cultivation method, but is preferably performed by a hydroponic method.

The hydroponic method is not particularly limited, and examples thereof include a Deep Flow Technique hydroponic method, Nutrient Film Technique hydroponic method, aeroponics, and drip hydroponics in which a liquid fertilizer is added dropwise to a root portion or a root portion support.

A cultivation facility for fruit vegetable plants after planting is not particularly limited, and examples thereof include an artificial light type plant factory, a solar type plant factory, a greenhouse, and the like.

From the viewpoints of quality of the harvested fruit and cultivation efficiency, the cultivation of a fruit vegetable plant after planting is preferably performed using a cultivation apparatus including one or more selected from a light source for irradiating the fruit vegetable plant with artificial light from at least one of an upper surface direction or side surface direction of the fruit vegetable plant, a hydroponic cultivation mechanism, and a temperature/humidity control mechanism.

In addition, the cultivation apparatus further more preferably includes a mechanism that controls an intensity of light of a light source, a light-dark cycle, a carbon dioxide concentration, and the like.

It is preferable that the cultivation step include a step of irradiating the fruit vegetable plant body with artificial light.

In the cultivation step, the temperature conditions can be adjusted by the artificial light with which the fruit vegetable plant body is irradiated. For example, the temperature can be adjusted to two or more temperature conditions of the light period temperature and the dark period temperature.

From the viewpoints of cultivation efficiency, achieving high sugar contents, and the like, the upper limit of the light period temperature is preferably 29° C. or lower, more preferably 28.5° C. or lower, and still more preferably 28° C. or lower.

From the viewpoints of cultivation efficiency, achieving high sugar contents, and the like, the lower limit of the light period temperature is preferably 15° C. or higher, more preferably 20° C. or higher, and still more preferably 25° C. or higher.

From the viewpoints of cultivation efficiency, achieving high sugar contents, and the like, the upper limit of the dark period temperature is preferably 25° C. or lower, more preferably 23° C. or lower, and still more preferably 22° C. or lower.

From the viewpoints of cultivation efficiency, achieving high sugar contents, and the like, the lower limit of the dark period temperature is preferably 10° C. or higher, more preferably 13° C. or higher, and still more preferably 15° C. or higher.

The light period temperature and the dark period temperature are measured by placing a thermometer at a position 1 cm away from the fruit vegetable plant body. As the thermometer, for example, a temperature/humidity sensor THA-3151 manufactured by T&D Corporation can be used.

In the present disclosure, the "light period" means a period during which the fruit vegetable plant body is subjected to irradiation by the light source. In addition, in the present disclosure, the "dark period" means a period during which the fruit vegetable plant body is not subjected to irradiation by the light source.

A method of controlling the light period temperature and the dark period temperature is not particularly limited and the light period temperature and the dark period temperature can be controlled by using a known method in the related art. For example, the controlling of the light period temperature and the dark period temperature can be performed by monitoring the light period temperature and the dark period temperature of the seedling raising environment with the above-described thermometer, and sending hot air or cold air as necessary.

From the viewpoints of cultivation efficiency, achieving high sugar contents, and the like, a ratio of the time of the light period to the time of the dark period (time of light period/time of dark period) is preferably 0.5 to 5, more preferably 1 to 4, and still more preferably 1 to 3.

The light source of the artificial light is not particularly limited, and examples thereof include semiconductor light sources such as a light emitting diode (LED), discharge lamps such as a fluorescent lamp, and the like. In the cultivation method for a fruit vegetable plant according to the present disclosure, it is preferable to use LEDs.

One type of LED may be used, or two or more types of LEDs may be used.

The LED may emit visible light such as red, blue, and yellow, or may emit invisible light of ultraviolet light (wavelength of 380 nm or less) or infrared light (wavelength of 780 nm or more). However, from a viewpoint of promoting photosynthesis of the fruit vegetable plant body, the LED preferably emits light in a wavelength range of 400 nm to 700 nm.

From the viewpoints of cultivation efficiency, achieving high sugar contents, and the like, the relative humidity in the cultivation step is preferably controlled within a range of 50% to 80%, and more preferably controlled within a range of 55% to 77%.

The relative humidity is measured by placing a hygrometer at a position 1 cm away from the fruit vegetable plant body. As the hygrometer, for example, a temperature/humidity sensor THA-3151 manufactured by T&D Corporation can be used.

A method of controlling the humidity is not particularly limited, and the humidity can be controlled by a known method in the related art. For example, the humidity condition can be controlled by monitoring the humidity of the cultivation environment with the above hygrometer and, as necessary, by using an air conditioning device having a humidifying function and a dehumidifying function.

From the viewpoints of cultivation efficiency, achieving high sugar contents, and the like, the intensity of the artificial light irradiated onto the fruit vegetable plant body in the cultivation step is preferably 200 μmol/m$^2$/s to 800 μmol/m$^2$/s, and more preferably 250 μmol/m$^2$/s to 600 μmol/m$^2$/s.

The intensity of light is measured by placing a light-receiving surface of a measuring instrument toward the light source at a position 1 cm away from the fruit vegetable plant body. As the measuring instrument, for example, a photon sensor (LI-190R, manufactured by LI-COR, Inc.) and the like can be used. In a case where the light sources are disposed in two or more directions from the fruit vegetable plant body, the total intensity of light measured by disposing the measuring instrument toward respective light sources is defined as the light intensity.

The intensity of light can be controlled by changing a type, the number, or the like of the light source (LED, fluorescent lamp, or the like) used, changing the distance between the light source and the fruit vegetable plant body, or using a dimmable light source.

The irradiation with artificial light may be performed from the upper surface direction of the fruit vegetable plant body or from the side surface direction thereof, but from the viewpoints of cultivation efficiency, space utilization efficiency, and the like, it is preferable to perform the irradiation from the upper surface direction.

In addition, the irradiation with the artificial light may be performed from both the side surface direction and the upper surface direction.

From the viewpoint of shortening the period until harvesting, in the cultivation step, the carbon dioxide concentration of the environment is preferably 300 ppm by volume to 2,000 ppm by volume, and more preferably 400 ppm by volume to 1,500 ppm by volume.

The carbon dioxide concentration is measured by placing a carbon dioxide meter at a position 1 cm away from the fruit vegetable plant body. As the carbon dioxide meter, for example, LI-850 manufactured by LI-COR, Inc. can be used.

The method of controlling the carbon dioxide concentration is not particularly limited, and the carbon dioxide concentration can be controlled by a known method in the related art. For example, the carbon dioxide concentration can be controlled by monitoring the carbon dioxide concentration in the environment with the above-described carbon dioxide meter and using an air conditioning device or the like, as necessary.

(Cultivation Period)

In the cultivation step, the period from the start of planting to harvesting is defined as the cultivation period.

The planting step is, for example, a step of planting the fruit vegetable plant seedling obtained in the seedling raising step described later at a predetermined position in an environment capable of hydroponic cultivation.

Usually, flowers are formed on the main stem of the fruit vegetable plant body at any time after planting.

In the present disclosure, a flower formed at the lowest position (a position closest to the root of the fruit vegetable plant body) on the main stem of the fruit vegetable plant body is referred to as a first flower cluster. In a case where the flower in the first flower cluster falls and fruit sets, the first flower cluster shall be referred to as a first fruit cluster. In addition, a flower formed at the lowest position on the main stem of the fruit vegetable plant body next to the first flower cluster or the first fruit cluster is referred to as a second flower cluster. Similarly, a flower cluster formed at the N-th level from the lowest position on the main stem of the fruit vegetable plant body is referred to as an N-th flower cluster, and a fruit cluster formed at the N-th level is referred to as an N-th fruit cluster.

After the flower cluster or the fruit cluster is formed, it is preferable to perform the pinching of the fruit vegetable plant body at a desired time. The pinching is to remove the apical portion of the fruit vegetable plant body to stop the elongation of the stem.

After pinching, it is preferable to harvest the fruit at a desired time.

The cultivation period is not particularly limited, but is preferably 70 days to 300 days, more preferably 80 days to 200 days, still more preferably 80 days to 150 days, and particularly preferably 90 days to 120 days.

(Nutrient Solution)

In the cultivation step, a nutrient solution is used.

In the preparation of nutrient solution, a desired fertilizer composition can be adjusted by appropriately selecting and formulating a single fertilizer. The formulation program "Best Blend" provided by NPO Japan Hydroponic Society of Japan may be used for adjusting the fertilizer composition of the nutrient solution. The component composition of the nutrient solution can have a target component content by correctly formulating the single fertilizer. In a case of quantifying the components in the nutrient solution, an ion chromatography method or a high-frequency inductively coupled plasma (ICP) method can be used.

In the cultivation method for a fruit vegetable plant of the present disclosure, a nutrient solution having an electrical conductivity of 5.5 dS/m or more (hereinafter, also referred to as a "high EC nutrient solution") is used for a period of 3 days or more during a period from after planting to flowering of one flower cluster. Hereinafter, the period in which the high EC nutrient solution is used is also referred to as "high EC nutrient solution use period".

In addition, in the period from the flowering of the one flower cluster to the harvesting, a nutrient solution having an electrical conductivity lower than the electrical conductivity of the specific nutrient solution by 1.5 dS/m or more (hereinafter, also referred to as a "low EC nutrient solution") is used. Hereinafter, the period in which the low EC nutrient solution is used is also referred to as "low EC nutrient solution use period".

The specific nutrient solution can be prepared, for example, by adding a salt such as sodium chloride, potassium chloride, or sodium sulfate. Among these, from the viewpoints of high yield, achieving high sugar contents, and the like, the specific nutrient solution preferably contains sodium chloride.

From the viewpoints of high yield, achieving high sugar contents, and the like, the above-described one flower cluster that is a standard for using the specific nutrient solution is preferably the first flower cluster.

That is, it is preferable that the high EC nutrient solution be used for a period of 3 days or more during a period from after planting to flowering of the first flower cluster, and the low EC nutrient solution be used for a period from the flowering of the first flower cluster to the harvesting.

By using the high EC nutrient solution for a period of 3 days or more during the period until the flowering of the first flower cluster, the yield and the sugar content of the fruit setting in the fruit cluster formed from the first flower cluster can be improved. Furthermore, the yield and the sugar content of the fruit setting in the fruit clusters formed from the flower cluster (second flower cluster, third flower cluster, and the like) formed after the first flower cluster can also be improved.

The high EC nutrient solution use period is 3 days or more, and from the viewpoints of high yield, achieving high sugar contents, and the like, the period is preferably 10 days or more and more preferably 20 days or more. The upper limit value of the high EC nutrient solution use period is not particularly limited, and is, for example, 40 days.

The electrical conductivity of the high EC nutrient solution is 5.5 dS/m or more, and from the viewpoints of high yield, achieving high sugar contents, and the like, the electrical conductivity is preferably 7.0 dS/m or more and more preferably 8.0 dS/m or more. The upper limit value of the electrical conductivity of the high EC nutrient solution is not particularly limited, and is, for example, 12 dS/m.

The low EC nutrient solution use period is not particularly limited, but is preferably 7 days or more and more preferably 40 days or more from the viewpoints of high yield, achieving high sugar contents, and the like. The upper limit value of the low EC nutrient solution use period is not particularly limited, and is, for example, 300 days.

The absolute value of the difference in electrical conductivity between the high EC nutrient solution and the low EC nutrient solution is 1.5 dS/m or more, and from the viewpoints of high yield, achieving high sugar contents, and the like, it is more preferably 3.0 dS/m or more. The upper limit value of the absolute value of the above-described difference is not particularly limited, and is, for example, 5.0 dS/m.

The electrical conductivity of the low EC nutrient solution is preferably 0.50 dS/m to 3.0 dS/m and more preferably 1.0 dS/m to 2.5 dS/m.

From the viewpoint of cultivation efficiency, it is preferable that the nutrient solution be switched once.

Specifically, it is preferable that the high EC nutrient solution be used for a period of 3 days or more during a period from after planting to flowering of one flower cluster, and the low EC nutrient solution be then used for a period of 7 days or more during a period from the flowering of one flower cluster to the harvesting.

<Seedling Raising Step>

The cultivation method for a fruit vegetable plant of the present disclosure can include a seedling raising step. In the seedling raising step, a fruit vegetable plant body after germination is raised as a fruit vegetable plant seedling.

From the viewpoint of cultivation efficiency, seedling raising of the fruit vegetable plant is preferably performed by a hydroponic method, and more preferably performed by a Deep Flow Technique hydroponic method.

From the viewpoint of cultivation efficiency, in the seedling raising step, it is preferable to use a nutrient solution (nutrient solution having a nitrogen concentration of more than 10 ppm by mass) other than the specific nutrient solution.

In the seedling raising step, the light period and the dark period can be switched by irradiating the fruit vegetable plant after germination with artificial light, and it is preferable that the temperature conditions be adjusted between the light period and the dark period. For example, the temperature can be adjusted to two or more temperature conditions of the light period temperature and the dark period temperature.

From the viewpoint of shortening the period until budding, the upper limit of the light period temperature is preferably 29° C. or lower, more preferably 28.5° C. or lower, and still more preferably 28° C. or lower.

From the viewpoint of shortening the period until budding, the lower limit of the light period temperature is preferably 15° C. or higher, more preferably 20° C. or higher, and still more preferably 25° C. or higher.

From the viewpoint of shortening the period until budding, the upper limit of the dark period temperature is preferably 25° C. or lower, more preferably 23° C. or lower, and still more preferably 22° C. or lower.

From the viewpoint of shortening the period until budding, the lower limit of the dark period temperature is preferably 10° C. or higher, more preferably 13° C. or higher, and still more preferably 15° C. or higher.

The light source, wavelength, and the like of the artificial light can be used as described in the cultivation step.

From the viewpoints of cultivation efficiency, achieving high sugar contents, and the like, a ratio of the time of the light period to the time of the dark period (time of light period/time of dark period) is preferably 0.3 to 3 and more preferably 0.5 to 2.

From the viewpoints of cultivation efficiency, achieving high sugar contents, and the like, the relative humidity in the seedling raising step is preferably controlled within a range of 50% to 80%, and more preferably controlled within a range of 55% to 77%.

From the viewpoints of cultivation efficiency, achieving high sugar contents, and the like, the intensity of the artificial light irradiated onto the fruit vegetable plant body after germination in the seedling raising step is preferably 200 $\mu mol/m^2/s$ to 800 $\mu mol/m^2/s$, and more preferably 250 $\mu mol/m^2/s$ to 600 $\mu mol/m^2/s$.

The irradiation with artificial light may be performed from the upper surface direction of the fruit vegetable plant body after germination or from the side surface direction thereof, but from the viewpoints of cultivation efficiency, space utilization efficiency, and the like, it is preferable to perform the irradiation from the upper surface direction.

In addition, the irradiation with the artificial light may be performed from both the side surface direction and the upper surface direction.

From the viewpoint of shortening the period until harvesting, in the seedling raising step, the carbon dioxide concentration of the environment is preferably 300 ppm by volume to 2,000 ppm by volume, and more preferably 400 ppm by volume to 1,500 ppm by volume.

The period of the seedling raising step is not particularly limited, and from the viewpoints of growth potential after planting, shortening of the period until budding, and the like, the seedling raising period is preferably 5 days to 40 days, more preferably 10 days to 35 days, still more preferably 12 days to 30 days, and particularly preferably 15 days to 33 days.

In a case where the seedling raising step is performed by the hydroponic method, the support for supporting the fruit vegetable plant body after germination is not particularly limited, and it preferably has a material having moderate water permeability and water retention, and is more preferably a support table provided with a urethane sponge, a phenol resin sponge, rock wool, or a water retention sheet.

<Germination Step>

The cultivation method for a fruit vegetable plant of the present disclosure can include a germination step. In the germination step, the seeds of the fruit vegetable plant used in the germination step are germinated.

A germination method is not particularly limited, and the germination can be performed by a known method in the related art.

For example, the germination can be performed by sowing seeds of a fruit vegetable plant on the support sufficiently moistened with water and storing in a dark place. Examples of the support include the same support as the support used in the seedling raising step.

In addition, it is preferable to select fruit vegetable plants having a similar degree of growth from among the seeds of the fruit vegetable plants in which germination is confirmed and to carry out raising seedlings. Accordingly, the harvesting time of the fruit can be matched, and the cultivation efficiency can be improved.

The temperature in the germination step varies depending on the item and variety of the fruit vegetable plant to be used, but in a case of commercially available seeds, these are generally disclosed as the germination temperature. In addition, in a case where the germination temperature is unknown, it can be experimentally confirmed. Furthermore, depending on the item and variety of the fruit vegetable plant to be used, it may be necessary to perform a treatment such as dormancy breaking during germination. In the germination process, there are those that require light of a specific wavelength, those that require to be under darkness, and those germinates in any of the cases. These can be also known in the same manner as the germination temperature.

The relative humidity in the germination process is preferably 70% to 100% and particularly preferably 80% to 95%. By setting the relative humidity to this range, it is possible to prevent drying of a plant body in the germination period and to make the growth good.

The period required for the germination process is not determined to be constant, but the period is preferably a period until rooting and subsequent hypocotyl elongation start, generally about several days to one week. By applying this period to the germination process, the roots can be sufficiently grown, and at the same time, it is possible to avoid excessive hypocotyl elongation. Therefore, the growth of seedlings in the subsequent seedling raising process is made good and a period until flowering can be shortened, which is preferable.

<Fruit Sugar Content>

In one embodiment of the cultivation method for a fruit vegetable plant of the present disclosure, the fruit vegetable plant is a tomato, and the Brix sugar content of the tomato is preferably 5.0% by mass or more, more preferably 5.5% by mass or more, still more preferably 6.0% by mass or more, and particularly preferably 7.0% by mass or more.

In the present disclosure, the "Brix sugar content" refers to a value in which a refractive index measured at 20° C. using a sugar content meter or a refractometer is converted into % by mass of a sucrose solution based on a conversion table of the International Commission for Uniform Methods of Sugar Analysis (ICUMSA). For example, in a case where a solution of 100 g contains x g of sucrose (water=100−x g), the Brix sugar content is x %.

In the present disclosure, the Brix sugar content of the tomato is measured by a sugar content measuring instrument (sugar content meter manufactured by Atago Co., Ltd.) after cutting the tomato in half along any plane in the longitudinal direction (direction orthogonal to the equatorial plane) of the tomato.

EXAMPLES

Hereinafter, the above-described embodiment will be specifically described with reference to Examples, but the above-described embodiment is not limited to these Examples.

<Preparation of Nutrient Solutions A to E>

By formulating single fertilizers, a nutrient solution A containing the following components was prepared.

$NO_3^-$: 430 ppm by mass
$K^+$: 177 ppm by mass
$PO_4^{3-}$: 100 ppm by mass
$Ca^{2+}$: 90 ppm by mass
$SO_4^{2-}$: 76 ppm by mass
$Mg^{2+}$: 25 ppm by mass
Mo: 30 ppb by mass
Zn: 150 ppb by mass
Fe: 1,750 ppb by mass
Cu: 80 ppb by mass
B: 350 ppb by mass
Mn: 560 ppb by mass
Ni: 50 ppb by mass The electrical conductivity (EC) of the nutrient solution A was 2.2 dS/m.

Sodium chloride was added to the nutrient solution A such that the electrical conductivity shown in Table 1 was obtained, thereby preparing nutrient solutions B to E.

TABLE 1

| | EC [dS/m] |
|---|---|
| Nutrient solution A | 2.2 |
| Nutrient solution B | 5.6 |
| Nutrient solution C | 5.2 |
| Nutrient solution D | 3.0 |
| Nutrient solution E | 8.0 |

Example 1

(Germination Step)

Tomato seeds (variety: Momotaro York (registered trademark), manufactured by TAKII & Co., Ltd) were sown on a support A (5 cm×5 cm×2 cm foamed polyurethane) sufficiently containing pure water, stored for 3 days in a dark environment at a temperature of 28° C. and a relative humidity of 70%, and germinated to obtain a tomato plant seedling.

(Seedling Raising Step)

The tomato plant seedling obtained in the above-described germination step was transplanted to a fruit vegetable plant hydroponic cultivation device that includes an artificial light irradiation device and a nutrient solution tank in which the nutrient solution A was contained, and raised seedlings for 22 days by a Deep Flow Technique hydroponic method.

(Cultivation Step)

The obtained tomato plant seedlings (40 plants) were planted in an environment capable of controlling temperature, humidity, and the intensity of light, to start cultivation under the following condition 1. In the cultivation period, according to the conventional method, the pruning (such as side shoot cutting, leaf plucking, and the like) and the training were performed in a single-stemmed manner, and at a time point (45th day after seeding) when one flower cluster (first flower cluster) was set on the main branch and the flowering of the first flower cluster was confirmed, the nutrient solution to be supplied was changed from the nutrient solution B to the nutrient solution A. Thereafter, at a time point when two flower clusters (a second flower cluster and a third flower cluster) were set on the main branch and flowering of the third flower cluster was confirmed, pinching was performed while leaving the apical bud of the third flower cluster. On the 120th day after seeding, fruits set to fruit clusters from the first to third levels were sequentially harvested.

Each fruit cluster was thinned out such that the number of fruit setting was 4, the tomato fruit born up to the third flower cluster was harvested, and the cultivation was terminated.

[Condition 1]

- Light source: plant growth LED four-color type, PGL-200DWB26D, manufactured by Ryoden Corporation
- Intensity of light: 500 μmol/m$^2$·s
- Light composition: in accordance with light emission behavior of the LED.
- Light-dark cycle (light period/dark period): 16 hours/8 hours
- Temperature: 27° C. (light period), 19° C. (dark period)
- Relative humidity: 70%
- Carbon dioxide concentration: 1,000 ppm
- Nutrient solution used: nutrient solution B

Example 2

Cultivation was performed by the same method as in Example 1, except that the nutrient solution to be supplied was changed from the nutrient solution B to the nutrient solution D at a time point when the flowering of the first flower cluster was confirmed (45th day after seeding).

Example 3

Cultivation was performed in the same manner as in Example 1, except that the nutrient solution E was used as the nutrient solution when the cultivation was started under the condition 1.

Example 4

Cultivation was performed for 7 days (from the 26th day to the 32nd day after seeding) using the nutrient solution A as the nutrient solution when the cultivation was started under the condition 1. After 7 days, the nutrient solution to be supplied was changed from the nutrient solution A to the nutrient solution E, and the cultivation was performed for 3 days (33rd day to 35th day after seeding). After three days, the cultivation was performed by the same method as in Example 1, except that the nutrient solution to be supplied was changed from the nutrient solution E to the nutrient solution A.

Example 5

Cultivation was performed for 5 days (from the 26th day to the 30th day after seeding) using the nutrient solution A as the nutrient solution when the cultivation was started under the condition 1. After 5 days, the nutrient solution to be supplied was changed from the nutrient solution A to the nutrient solution E, and the cultivation was performed for 20 days (31st day to 50th day after seeding). The nutrient solution to be supplied was changed from the nutrient solution E to the nutrient solution A at a time point when the flowering of the second flower cluster was confirmed (50th day after seeding). Thereafter, at a time point when two flower clusters (a third flower cluster and a fourth flower cluster) were set on the main branch and flowering of the fourth flower cluster was confirmed, pinching was performed while leaving the apical bud of the fourth flower cluster. On the 127th day after seeding, fruits set to fruit clusters from the first to fourth levels were sequentially harvested.

Each fruit cluster was thinned out such that the number of fruit setting was 4, the tomato fruit born up to the fourth flower cluster was harvested, and the cultivation was terminated.

Comparative Example 1

Cultivation was performed in the same manner as in Example 1, except that the nutrient solution C was used as the nutrient solution when the cultivation was started under the condition 1.

Comparative Example 2

Cultivation was performed in the same manner as in Example 1, except that the nutrient solution E was used as the nutrient solution when the cultivation was started under the condition 1 and the nutrient solution was not switched as it was.

Comparative Example 3

Cultivation was performed in the same manner as in Example 1, except that the nutrient solution A was used as the nutrient solution when the cultivation was started under the condition 1 and switching of the nutrient solution was not performed.

<<Evaluation>>

[Average Number of Fruits Harvested, Average Fruit Weight, and Average Yield]

The average number of fruits harvested per plant, the average weight per fruit (average fruit weight), and the average weight (average yield) of fruits harvested per plant in Examples and Comparative Examples were calculated.

[Average Brix Sugar Content]

The harvested tomato was cut into halves along any plane in the longitudinal direction (direction orthogonal to the equatorial plane), one of the divided halves was crushed into a juice-like form, and a part of the other half was measured with a sugar content measuring instrument (sugar content meter manufactured by Atago Co., Ltd.). The average value of the Brix sugar contents of the each fruit was calculated.

In Example 5, the average value of the fruits harvested at the second to fourth levels was adopted.

The evaluation results are shown in Table 2.

In Table 2, the nutrient solutions used in the seedling raising step and the cultivation step and the number of days of use of the nutrient solutions are described. The upper part of the column of the nutrient solution indicates the type of the nutrient solution, and the lower part indicates the electrical conductivity (the unit is "dS/m") of the nutrient solution. The cultivation step was divided into a period from planting to a time point when flowering of the first flower cluster was confirmed, a period from the time point when flowering of the first flower cluster was confirmed to a time point when flowering of the second flower cluster was confirmed, and a period from the time point when flowering of the second flower cluster was confirmed to harvesting.

TABLE 2

| | Seedling raising step | | Cultivation step: From planting to flowering of first flower cluster | | | | | | Cultivation step: To flowering of second flower cluster |
|---|---|---|---|---|---|---|---|---|---|
| | Nutrient solution | Number of days | Nutrient solution | Number of days | Nutrient solution | Number of days | Nutrient solution | Number of days | Nutrient solution |
| Example 1 | A 2.2 | 25 | B 5.6 | 20 | | — | | | A 2.2 |
| Example 2 | A 2.2 | 25 | B 5.6 | 20 | | — | | | D 3.0 |
| Example 3 | A 2.2 | 25 | E 8.0 | 20 | | — | | | A 2.2 |
| Example 4 | A 2.2 | 25 | A 2.2 | 7 | E 8.0 | 3 | A 2.2 | 10 | A 2.2 |
| Example 5 | A 2.2 | 25 | A 2.2 | 5 | E 8.0 | 15 | — | | E 8.0 |
| Comparative Example 1 | A 2.2 | 25 | C 5.2 | 20 | | — | | | A 2.2 |
| Comparative Example 2 | A 2.2 | 25 | E 8.0 | 20 | | — | | | E 8.0 |
| Comparative Example 3 | A 2.2 | 25 | A 2.2 | 20 | | — | | | A 2.2 |

| | Cultivation step: To flowering of second flower cluster | Cultivation step: To harvesting | | Evaluation | | | |
|---|---|---|---|---|---|---|---|
| | Number of days | Nutrient solution | Number of days | Average number of fruits harvested [Number/plant] | Average fruit weight [g] | Average yield [g/plant] | Average Brix sugar content [%] |
| Example 1 | 5 | A 2.2 | 70 | 12 | 151 | 1,812 | 5.1 |
| Example 2 | 5 | D 3.0 | 70 | 12 | 144 | 1,723 | 5.5 |
| Example 3 | 5 | A 2.2 | 70 | 12 | 175 | 2,100 | 5.1 |
| Example 4 | 5 | A 2.2 | 70 | 12 | 155 | 1,860 | 4.9 |
| Example 5 | 5 | A 2.2 | 77 | 12 | 160 | 1,920 | 5.2 |
| Comparative Example 1 | 5 | A 2.2 | 70 | 12 | 115 | 1,380 | 4.5 |
| Comparative Example 2 | 5 | E 8.0 | 70 | 12 | 49 | 588 | 8.3 |
| Comparative Example 3 | 5 | A 2.2 | 70 | 12 | 105 | 1,260 | 4.8 |

As shown in Table 2, it was found that in Examples 1 to 5, since a nutrient solution having an electrical conductivity of 5.5 dS/m or more for a period of 3 days or more during a period from after planting to flowering of one flower cluster, and using a nutrient solution having an electrical conductivity lower than the electrical conductivity of the nutrient solution by 1.5 dS/m or more for a period from the flowering of the one flower cluster to harvesting, a fruit having a high sugar content could be harvested with a high yield.

On the other hand, in Comparative Example 1, it was found that since the nutrient solution having an electrical conductivity of 5.5 dS/m or more was not used, the sugar content of the harvested fruit was low.

In Comparative Example 2, it was found that since only the nutrient solution having an electrical conductivity of 8.0 dS/m was used in the cultivation step, the yield was low.

In Comparative Example 3, it was found that since only the nutrient solution having an electrical conductivity of 2.2 dS/m was used in the cultivation step, the sugar content of the harvested fruit was low.

The entire disclosure of Japanese Patent Application No. 2023-027722, filed Feb. 24, 2023, is incorporated into the present specification by reference. In addition, all documents, patent applications, and technical standards described in the present specification are herein incorporated by reference to the same extent that each individual document, patent application, or technical standard was specifically and individually indicated to be incorporated by reference.

What is claimed is:

1. A cultivation method for a fruiting vegetable plant, comprising:

using a first nutrient solution having an electrical conductivity of 5.5 dS/m or more for a period of 3 days or more during a period from after planting to flowering of one flower cluster; and using a second nutrient solution having an electrical conductivity lower than the electrical conductivity of the first nutrient solution by 1.5 dS/m or more for a period from the flowering of the one flower cluster to harvesting.

2. The cultivation method for a fruiting vegetable plant according to claim 1, wherein the one flower cluster is a first flower cluster.

3. The cultivation method for a fruiting vegetable plant according to claim 1, wherein the fruiting vegetable plant is a Solanaceae plant or a Cucurbitaceae plant.

4. The cultivation method for a fruiting vegetable plant according to claim 1, wherein the fruiting vegetable plant is a tomato.

5. The cultivation method for a fruiting vegetable plant according to claim 1, further comprising:

irradiating a plant body of the fruiting vegetable plant with artificial light.

* * * * *